(12) United States Patent
Leme et al.

(10) Patent No.: US 8,272,112 B2
(45) Date of Patent: Sep. 25, 2012

(54) TOOL SET FOR THE INTRODUCTION IN A SHEATH OF A FLOW-MONITORING DEVICE FOR A FLUID PIPING, AND AN IMPLEMENTATION METHOD THEREFORE

(75) Inventors: David Leme, Paris (FR); Amine Dalibey, Villejuif (FR); Didier Mangon, Lanches Saint-Hilaire (FR)

(73) Assignee: GDF Suez, Paris (FR)

( * ) Notice: Subject to any disclaimer, the term of this patent is extended or adjusted under 35 U.S.C. 154(b) by 803 days.

(21) Appl. No.: 12/466,567

(22) Filed: May 15, 2009

(65) Prior Publication Data
US 2010/0000068 A1    Jan. 7, 2010

(30) Foreign Application Priority Data
May 20, 2008 (FR) ...................... 08 53279

(51) Int. Cl.
*B23P 19/02* (2006.01)
(52) U.S. Cl. ............... 29/235; 29/446; 29/450; 29/451; 29/890.09; 137/315.01
(58) Field of Classification Search ............ 29/235, 29/446, 450, 451, 890.09, 237, 244, 254, 29/255, 282, 464, 466, 469; 137/315.01, 137/315.33, 497, 498, 507, 517; 251/143
See application file for complete search history.

(56) References Cited

U.S. PATENT DOCUMENTS

| | | | | |
|---|---|---|---|---|
| 3,898,918 A | * | 8/1975 | Carter | 138/93 |
| 4,856,552 A | * | 8/1989 | Hiemstra | 137/497 |
| 4,958,657 A | * | 9/1990 | Hagan et al. | 137/513.5 |
| 6,062,264 A | * | 5/2000 | Dickson | 138/98 |
| 6,962,165 B2 | * | 11/2005 | Delprat et al. | 137/498 |
| 8,028,573 B2 | * | 10/2011 | Leme et al. | 73/272 R |

(Continued)

FOREIGN PATENT DOCUMENTS

FR     2870316 A1    11/2005
(Continued)

OTHER PUBLICATIONS

Rapport De Recherche Préliminaire of French Application No. 0853279 mailed Jan. 29, 2009.

(Continued)

*Primary Examiner* — David Bryant
*Assistant Examiner* — Ryan J Walters
(74) *Attorney, Agent, or Firm* — Winston & Strawn LLP

(57) ABSTRACT

The invention particularly relates to a tool set making it possible to introduce in a sheath (2) a flow-monitoring device (1) comprising a hollow body (11), a valve (12), a cup-type seal member (13), and a plurality of retention elastic legs (14). This tool set comprises three tools (3, 4, 5), whereof the first tool is formed of a contention bushing (31) and an ejecting pusher (32), whereof the third tool (5) receives the sheath (2) and comprises a cylinder (51) wherein a centering piston (51) slides in the sheath, and whereof the second tool (4) shaped like a funnel, is inserted between the first tool (3) and the third tool (5), and makes it possible to radially compress the seal (13) and the legs (14) of the device (1) while inserting them into the sheath (2) while this device is pushed out of the first tool.

9 Claims, 5 Drawing Sheets

U.S. PATENT DOCUMENTS

| | | | |
|---|---|---|---|
| 2004/0103943 A1* | 6/2004 | Delprat et al. | 137/498 |
| 2005/0252552 A1* | 11/2005 | Pineau et al. | 137/315.01 |
| 2010/0200086 A1* | 8/2010 | Dalibey et al. | 137/511 |

FOREIGN PATENT DOCUMENTS

| | | |
|---|---|---|
| FR | 2916511 | 11/2008 |
| GB | 2 196 715 A | 5/1988 |
| GB | 2 244 780 A | 12/1991 |

OTHER PUBLICATIONS

Opinion Ecrite Sur La Brevetabilite De L'Invention of French Application No. 0853279.

* cited by examiner

TOOL SET FOR THE INTRODUCTION IN A SHEATH OF A FLOW-MONITORING DEVICE FOR A FLUID PIPING, AND AN IMPLEMENTATION METHOD THEREFORE

CROSS REFERENCE TO RELATED APPLICATION

This application claims priority from French Application No. 0853279 filed May 20, 2008, which application is incorporated herein by reference.

BACKGROUND

The invention generally relates to techniques for managing and operating fluid-dispensing networks, particularly gas.

SUMMARY

According to a first aspect, the invention relates, more specifically, to a tool set for the introduction of a flow-monitoring device in a sheath, in view of a later insertion of this device, jacketed by the sheath, in a fluid piping, this flow-monitoring device comprising a hollow body provided with an upstream end and a downstream end, a valve integrated to the hollow body and designed to close in response to an excessive flow rate of fluid in the piping, a cup-type seal member arranged at the downstream end of the hollow body, and a plurality of elastic legs connected to the hollow body between the upstream and downstream ends of this hollow body and designed to distend elastically by their free ends turned towards the downstream end of the hollow body, once the device set in the piping, the seal and the legs being folded radially and elastically stressed in the sheath following the introduction of this device into the sheath.

A flow-monitoring device of the related type is shown in FIG. 1 and described in patent application FR 2 916 511.

In order to be placed in a piping, the devices of this type should first be partially introduced in a sheath of radial contention, as described in patent documents FR 2 870 316 and FR 2 916 511.

Yet, this operation should be achieved rigorously and precisely so as to avoid any damage to the flow-monitoring device during its introduction in the sheath.

In this context, the object of the invention is to propose a tool set making it possible to achieve this operation simply, surely and reproducibly.

To this end, the tool set of the invention, which still further conforms to the generic definition given by the preamble above, is substantially characterized in that it comprises at least three tools, in that the first tool comprises a bushing and an ejecting pusher, the bushing being dimensioned for receiving the flow-monitoring device introduced from its upstream end and for housing, with the exception of the cup-type seal member, this flow-monitoring device in a position in which the legs are folded, the pusher being slidingly mounted with respect to the bushing, making it possible to at least partially eject the device from the bushing, in that the third tool comprises a cylinder and a centering piston sliding in the cylinder, this centering piston being elastically biased by a pre-stressed spring towards an idle position wherein it partially extends out of the cylinder, and being dimensioned so as to constitute, in the idle position, an inner guide for the sheath introduced in the cylinder to an inner stopper of this cylinder, in that the second tool is shaped like a funnel and comprises two symmetrical half-shells, this second tool exhibiting an inlet stack adapted to receive at least partially the bushing, an outlet stack dimensioned to receive at least partially the sheath and to be partially introduced in the cylinder, and a radially tapering area, connecting the inlet stack to the outlet stack and exhibiting, on the side of the outlet stack, a section at most equal to the inner section of the sheath.

To make its usage even more easier, the tool set of the invention may be achieved such that it further comprises a lever, at least one forked support member, and a chassis to which the lever and the forked support member are connected, that the lever be rotatably mounted around an axis spaced apart from the chassis and that it comprises at least a first bearing member, that the forked support member exhibits a fork spaced apart from the chassis and extending parallely to the rotational axis of the lever, that the fork be dimensioned to serve as a bearing to the bushing of the first tool by leaving the pusher free, and that the first bearing member of the lever be arranged above the fork.

It may also be judicious that the lever comprises a second bearing member spaced apart from the first bearing member both along the lever and along a direction perpendicular to the lever and to its rotational axis, the second bearing member thus being further away from the chassis than the first bearing member, and that the third tool be connected to the chassis by its cylinder, and that the second bearing member of the lever be arranged above the centering piston of the third tool.

The chassis may for example comprise a wall of a mallet holding at least the three tools.

According to a second aspect, the invention also relates to a method of implementing the tool set as described previously for insertion into the sheath, of the flow-monitoring device intended to be later inserted in a fluid piping, this method being characterized in that it comprises the steps of: introducing by its upstream end the device into the bushing of the first tool by applying a joining force bringing together the bushing and the downstream end of the device, the pusher of this first tool being thus pushed out of the bushing; placing the sheath on the centering piston of the third tool, this piston being placed in its idle position; inserting the outlet stack of the second tool in the cylinder of the third tool; inserting, in the inlet stack of the second tool, the bushing of the first tool by bringing it on the side of the cup-type seal extending out of this bushing, which has at least the effect of radially compressing the cup-type seal in the tapering area of the second tool; and gradually inserting the pusher of the first tool into the bushing, which has at least the effect of partially ejecting the device from the bushing by radially compressing the elastic legs in the tapering area of the second tool, to integrally inserting the seal into the sheath as well as introducing the legs by pushing back, by the downstream end of the device, the centering piston in the cylinder against the return force of the pre-stressed spring.

In the case where the tool set comprises a lever fitted with a first bearing member, the method of the invention preferably comprises an additional step, performed before the introduction of the device into the bushing of the first tool, and of placing this bushing on the fork by leaving the pusher extending out under the fork, the joining force can thus be exerted by bringing the lever and the chassis closer whereas the first bearing member is applied to the downstream end of the flow-monitoring device.

In the case where the tool set comprises a lever fitted with a second bearing member, the step of gradually inserting the pusher of the first tool in the bushing can be easily carried out by bringing the lever closer to the chassis while the second bearing member is applied to the pusher of the first tool.

BRIEF DESCRIPTION OF THE DRAWINGS

Other characteristics and advantages of the invention will become more apparent from the following description thereof, given by way of a non limitative example, with reference to the accompanying drawings, in which.

DETAILED DESCRIPTION

As aforementioned, the invention substantially relates to a tool set that makes it possible to introduce a flow-monitoring device 1 in a sheath 2, this operation preparing for the later insertion of this device, once jacketed by the sheath 2, in a fluid piping, and particularly in a gas piping.

Figure 1:
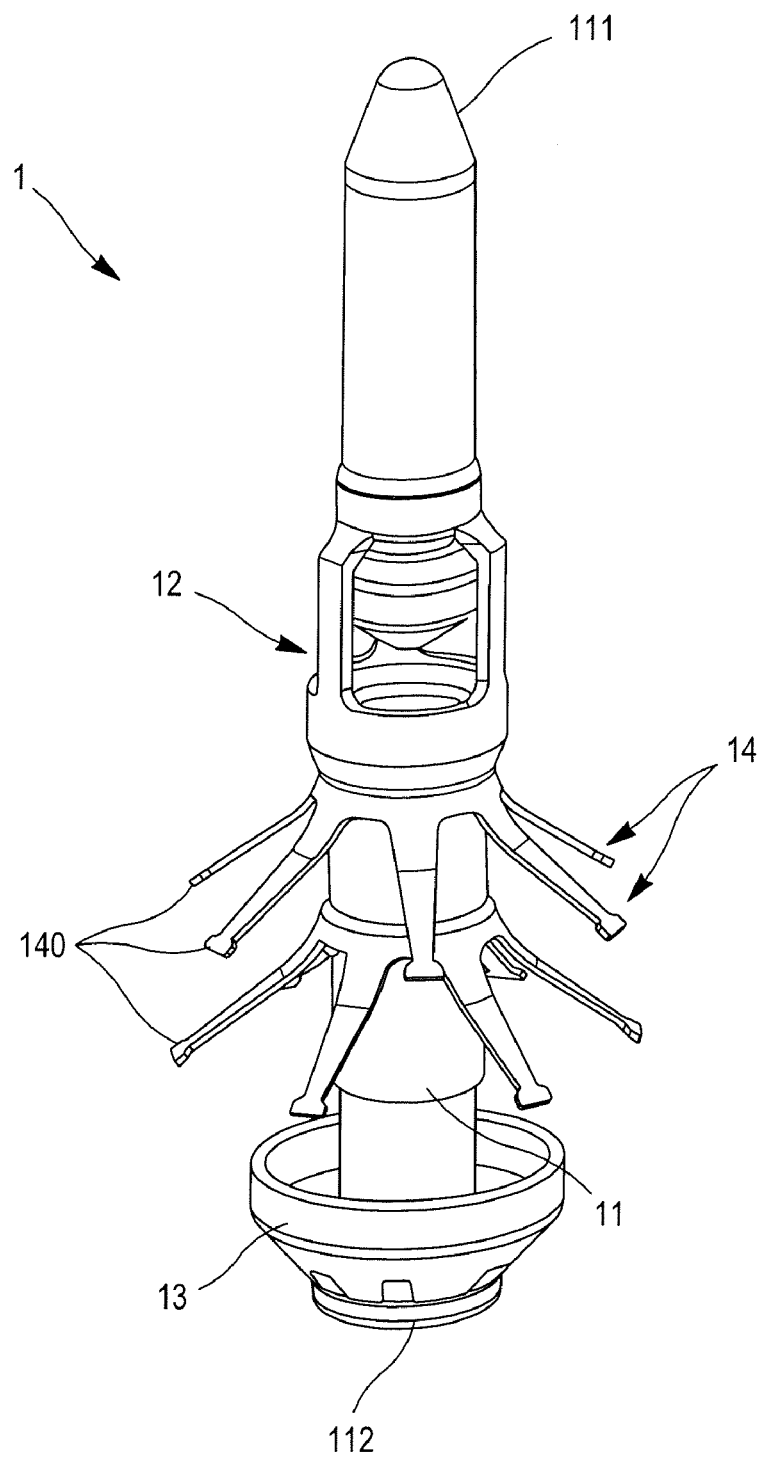
FIG. 1 is a perspective view of a flow-monitoring device related to the tool set of the invention.

The related flow-monitoring device has been described in patent application FR 2 916 511, and is shown on FIG. 1.

Such a device 1 typically comprises a hollow body 11, a valve 12, a cup-type seal member 13, and a plurality of elastic legs 14.

The hollow body 11 exhibits an upstream end 111 forming an introduction nose, and a downstream end 112 bearing the cup-type seal member 13.

Valve 12, which is set in the hollow body 11, is designed to close and to correspondingly shut-off the hollow body when the fluid flow rate in the piping exceeds a predetermined boundary value.

The cup-type seal member 13, surrounding the hollow body 11 and applied on the inner wall of the piping, forces the fluid flowing in the piping to cross the hollow body 11, the fluid flow being thus blocked when valve 12 shuts off hollow body 11.

The elastic legs 14, that are connected to the hollow body 11 between the upstream and downstream ends 111 and 112 of this hollow body 11, are designed to distend elastically, by their free ends 140 turned towards the downstream end 112 of hollow body 1, once the device 1 is set in the piping, and thus to hold this device in place in the piping.

Figure 7:
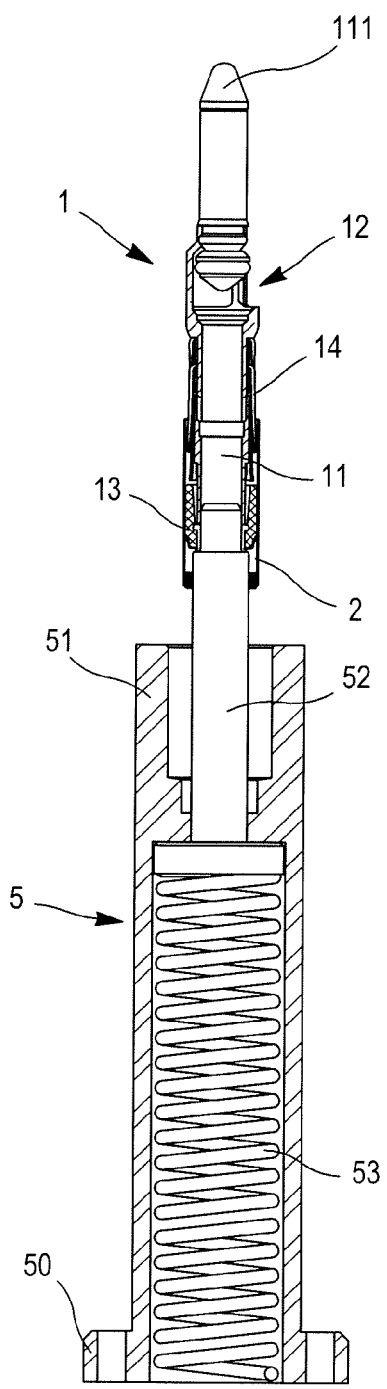
FIG. 7 is an axial cross-section view of the third tool shown subsequently to the insertion phase of a flow-monitoring device such as shown in FIG. 1 in a sheath.

Nevertheless, in order to be inserted in a piping, such a device 1 should first be partially introduced in a sheath 2, the seal 13 and the legs 14 thus being radially folded and elastically stressed in this sheath 2 (FIG. 7).

To this end, the tool set of the invention comprises at least three tools 3, 4, and 5.

Figure 2:
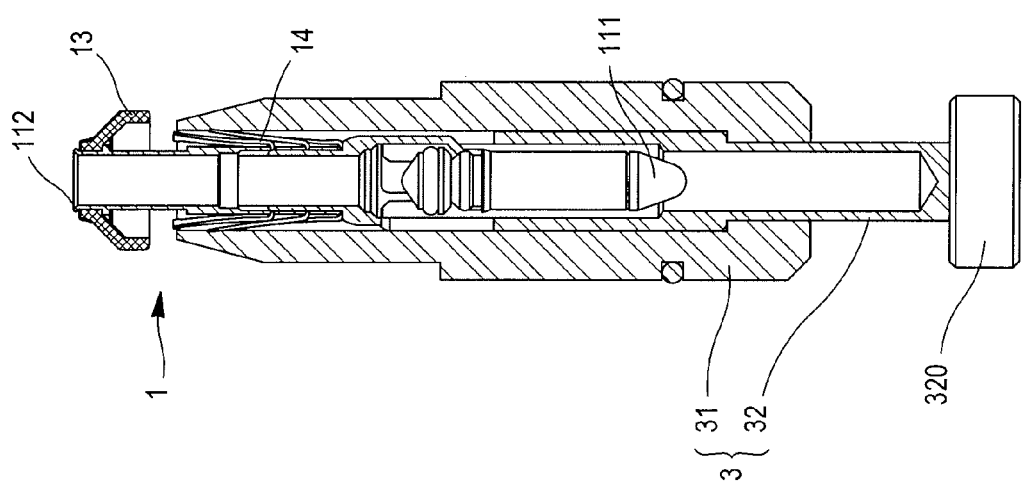
FIGS. 2 and 3 are axial cross-section views showing the partial insertion of a flow-monitoring device such as shown in FIG. 1 in the bushing of the first tool belonging to the tool set of the invention.
Figure 3:
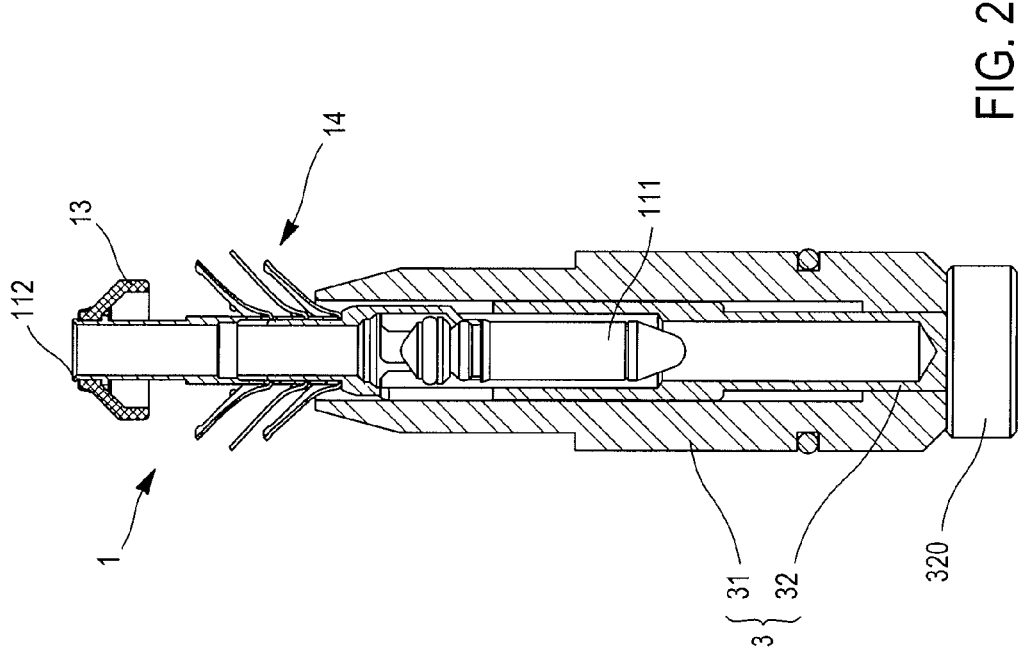

The first tool 3, particularly visible on FIGS. 2 and 3, comprises a bushing 31 and a ejecting pusher 32.

As shown on these drawings, bushing 31 is dimensioned to receive the device 1 when this device is introduced therein by its upstream end 111.

Furthermore, bushing 31 is dimensioned to house this device 1, with the exception of its cup-type seal 13, in a configuration in which the elastic legs 14 are in a folded position towards the hollow body 11.

Figure 4:
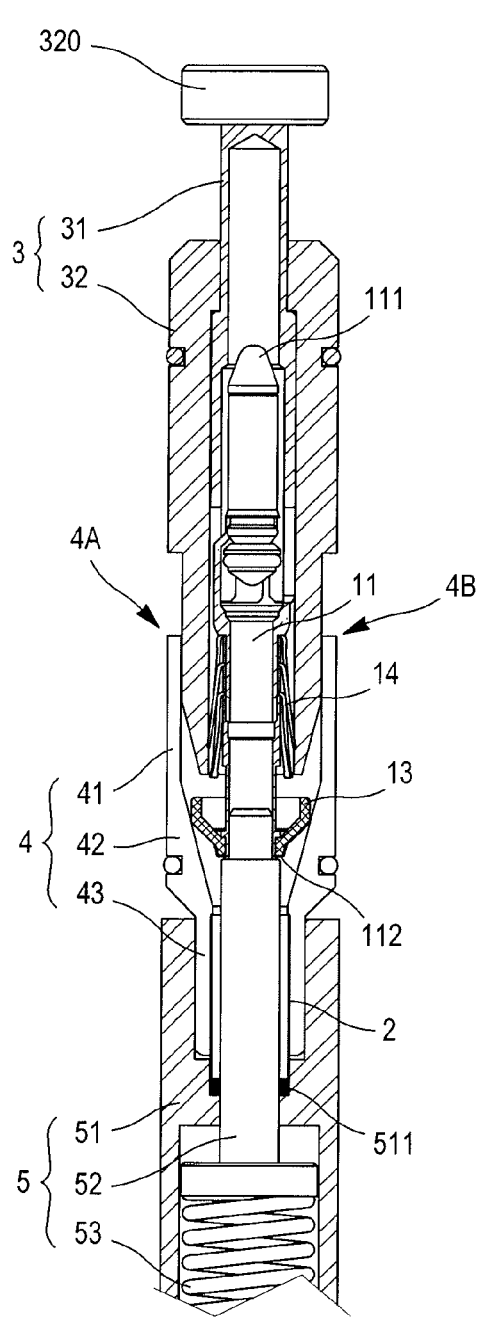
FIGS. 4 and 5 are partial axial cross-section views of the three tools belonging to the tool set of the invention, shown at successive moments of the insertion phase of a flow-monitoring device such as shown in FIG. 1 in a sheath.
Figure 5:
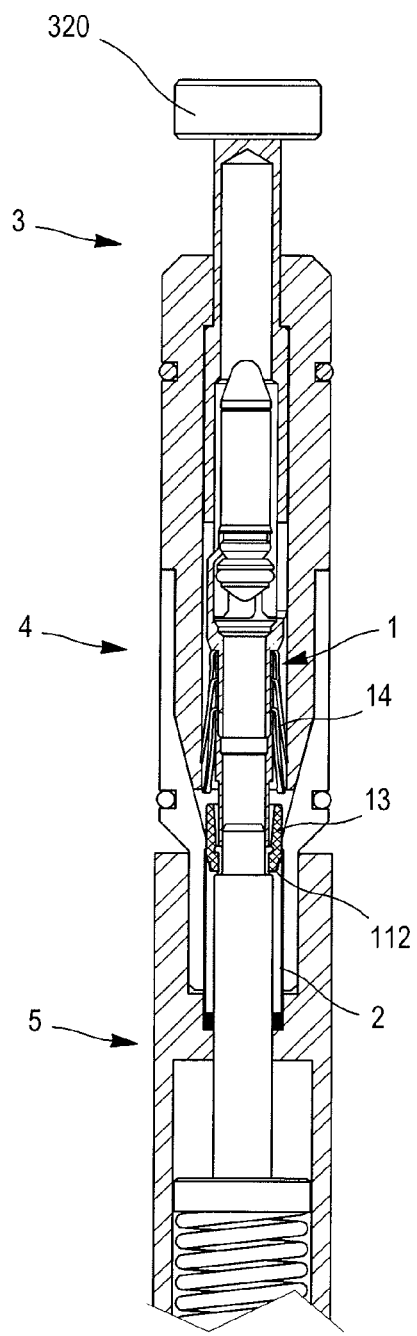

The pusher 32, which is advantageously provided with a head 320, is slidingly mounted with respect to the bushing 31, making it possible for it to eject at least partially the device 1 out of the bushing 31 as shown further down in FIGS. 4 and 5.

The second tool 4 is designed to cooperate with the two other tools and thus, it will also be described later.

Figure 6:
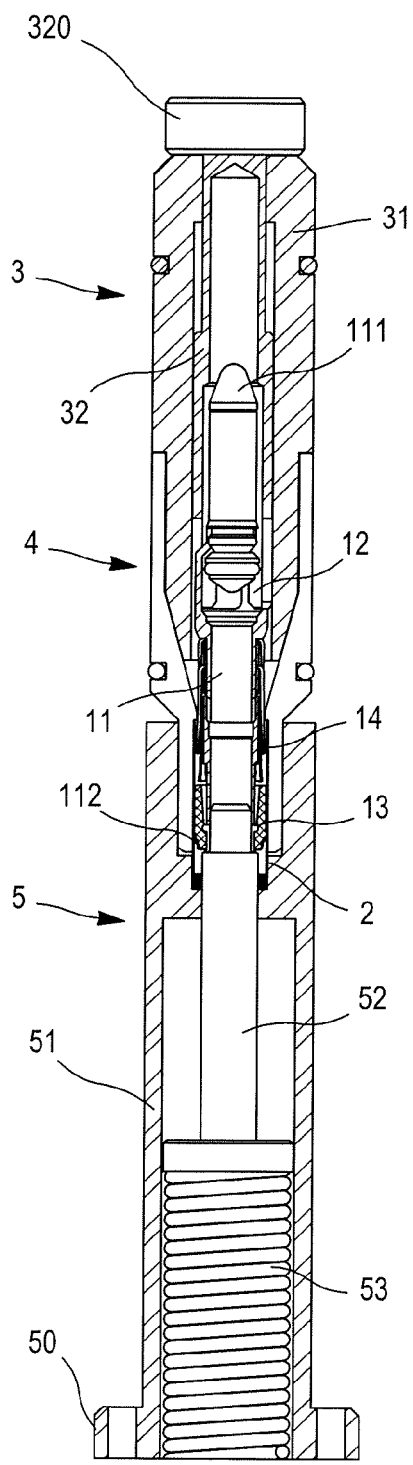
FIG. 6 is an axial cross-section view of the three tools belonging to the tool set of the invention, shown at the end of the insertion phase of a flow-monitoring device such as shown in FIG. 1 in a sheath.

The third tool 5, partially visible in FIGS. 4 and 5 and integrally visible in FIGS. 6 and 7, comprises a cylinder 51, a centering piston 52, and a pre-stressed spring 53.

The centering piston 52 is slidingly mounted in the cylinder 51 and elastically biased by the spring 53 to an idle position wherein it partially extends out of the cylinder 51.

As FIG. 4 particularly suggests, the centering piston 52 is further dimensioned to constitute, in an idle position, an inner guide for the sheath 2, this sheath being able to be inserted in the cylinder 51 to an inner stopper 511 provided in this cylinder 51.

The second tool 4 is shaped like a funnel and is composed of two symmetrical half-shells 4A and 4B.

This second tool 4 exhibits an inlet stack 41, an outlet stack 43, and an intermediate radially tapering area 42.

The inlet stack 41 is dimensioned to receive the lower part of the bushing 31.

The outlet stack 43 is dimensioned to receive at least partially the sheath 2, and to be itself partially introduced into the cylinder 51.

And the radially tapering area 42, that connects the inlet stack 41 to the outlet stack 43, exhibits, on the outlet stack 43 side, a section at most equal to the inner section of sheath 2.

Figure 8:
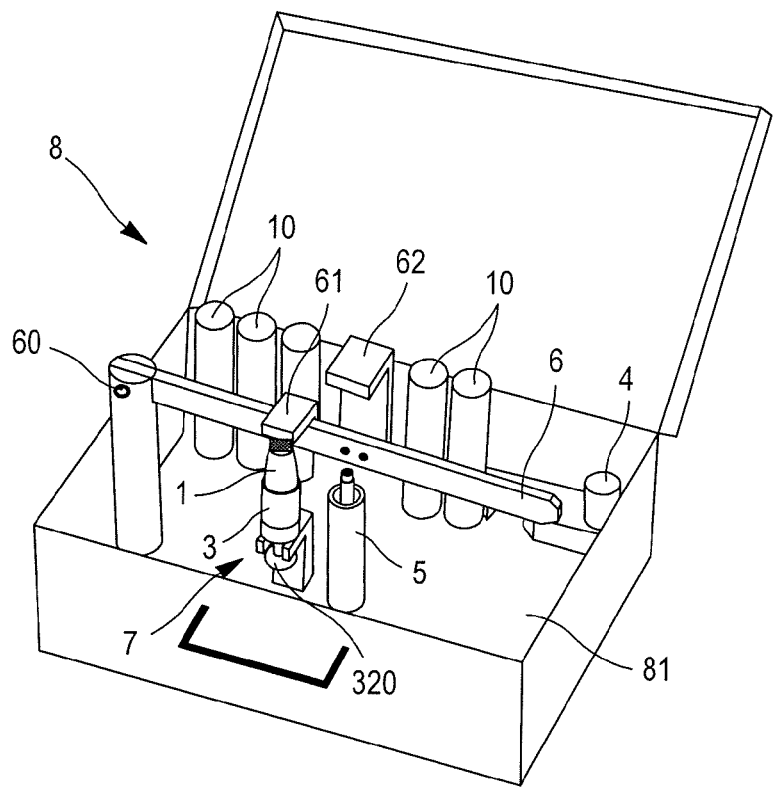
FIG. 8 is a perspective view showing a tool set according to a preferred embodiment of the invention, shown in a configuration corresponding to the step shown in FIG. 3.
Figure 9:
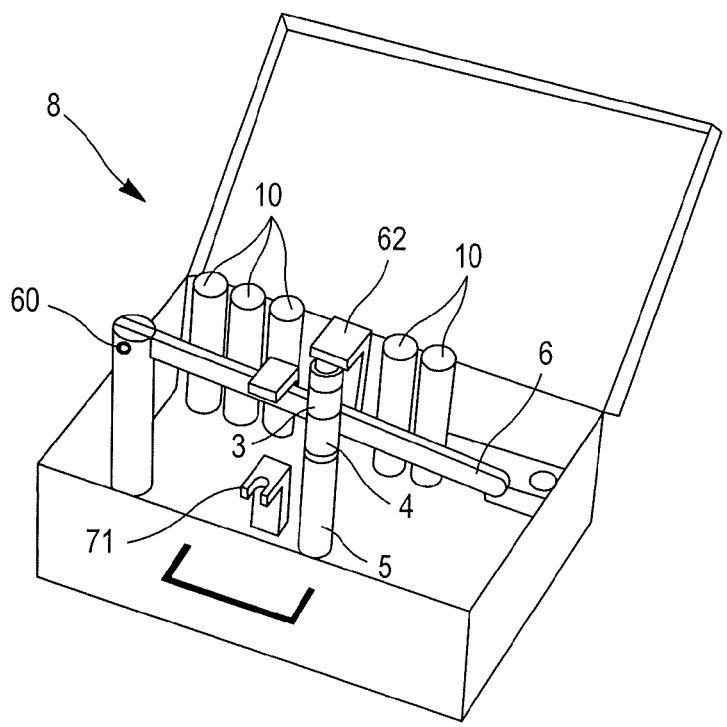
FIG. 9 is a perspective view showing a tool set according to the preferred embodiment of the invention, shown in the configuration corresponding to the step shown in FIG. 6.

As shown by FIGS. 8 and 9, the tool set of the invention also preferably comprises a lever 6, a forked support member 7, and a chassis 81.

In fact, the chassis 81, to which the lever 6 and the forked support member 7 are connected, can be constituted by a wall of a mallet 8 containing, in particular, the three tools 3, 4 and 5 and possibly, cases 10 each enclosing a device 1.

Lever 6 is rotatably mounted around an axis 60 spaced apart from the chassis 81 and advantageously comprises two bearing members 61 and 62.

The second bearing member 62 is spaced apart from the first bearing member 61 both along the lever 6 and along a direction perpendicular to the lever 6 and to its rotational axis 60, this second bearing member 62 thus being further away from the chassis 81 than the first bearing member 61.

The forked support member 7 exhibits a fork 71 that is spaced apart from the chassis 81 and which extends parallel to the rotational axis 60 of the lever 6.

The fork 71 is dimensioned to serve as a bearing to bushing 31 of first tool 3 by leaving the pusher 32, particularly its head 320 (FIG. 8), free.

As FIGS. 8 and 9 suggest, third tool 5 is preferably connected to the chassis 81, for example, by its cylinder 51 or more precisely by the sub plate 50 (FIGS. 6 and 7) of this cylinder.

The first bearing member 61 of lever 6 is arranged above the fork 71, whereas the second bearing member 62 of lever 6 is arranged above the centering piston 52 of third tool 5.

The invention also relates to a method of implementing the aforementioned described tool set, this method making it possible to introduce in the sheath 2 the flow-monitoring device 1 intended to be inserted in a fluid piping.

The first step of this method, shown in FIGS. 2 and 3, consists in introducing, by its upstream end 111, the device 1 in bushing 31 of first tool 3 by applying a joining force that brings together this bushing 31 and the downstream end 112 of device 1, the pusher 32 of the first tool 3 being, either beforehand, or during this step, pushed back out of the bushing 31.

The second step of this method, that is suggested in FIGS. 4 and 5 which show the result, consist in placing sheath 2 on the centering piston 52 of third tool 5, this piston 52 being thus placed in its idle position.

The third step of the method, also suggested in FIGS. 4 and 5 and before the state shown on these drawings, consists in inserting the outlet stack 43 of second tool 4 in the cylinder 51 of third tool 5.

The fourth step of the method, that FIGS. 4 and 5 specifically show, consists in inserting, in the inlet stack 41 of the second tool 4, the bushing 31 of first tool 3 by bringing it on the side of the cup-type seal 13 that extends out of this bushing 31.

This step has also the effect of radially compressing the cup-type seal 13 in the tapering area 42 of the second tool 4 and may possibly start the introduction of the seal 13 in the sheath 2.

The fifth step of the method, the result of which is visible on FIG. 6, consists in gradually inserting the pusher 32 of first tool 3 into the bushing 31.

This operation has particularly the effect of partially ejecting the device 1 out of bushing 31 by radially compressing the elastic legs 14 in the tapering area 42 of the second tool 4, to integrally insert the seal 13 into the sheath 2 and to also introduce legs 14 in this sheath 2.

Moreover, during this step, the downstream end 112 of device 1 pushes back the centering piston 52 in cylinder 51 against the return force exerted by the pre-stressed spring 53.

In the preferred case in which the tool set of the invention particularly comprises the lever 6 and the forked support member 7 such as shown in FIGS. 8 and 9, the method of the invention comprises, before the first step, a preparatory operation of placing bushing 31 of the first tool 3 on the fork 71 of the support member 7 while leaving pusher 32, and particularly its head 320, extended under the fork 71.

The joining force which needs to be applied between bushing 31 and downstream end 112 of device 1 can thus be exerted (FIG. 8) by bringing lever 6 closer to chassis 81 while the first bearing member 61 is applied on the downstream end 112 of this device 1.

Furthermore, the fifth step, of gradually inserting pusher 32 of first tool 3 in the bushing 31 can be carried out (FIG. 9) by bringing lever 6 closer to chassis 81 while the second bearing member 62 is applied on the pusher 32 of the first tool 3.

The invention claimed is:

1. A tool set for the introduction of a flow-monitoring device jacketed by a sheath, into a fluid piping, the flow-monitoring device comprising a hollow body provided with an upstream end and a downstream end,
   a valve integrated with the hollow body and designed to close in response to an excessive fluid flow rate through the piping,
   a cup-type seal member arranged at the downstream end of the hollow body, and a plurality of elastic legs connected to the hollow body between the upstream and downstream ends of the hollow body, wherein the elastic legs are designed to distend elastically with their free ends facing towards the downstream end of the hollow body once the device is set in the piping, wherein the seal member and the elastic legs become radially folded and elastically stressed after the device is introduced into the sheath, wherein the tool set comprises at least three tools,
   a first tool comprising a bushing and an ejecting pusher, the bushing being dimensioned to receive the flow-monitoring device introduced from its upstream end and to house, with the exception of the cup-type seal, the flow-monitoring device in a position where said elastic legs are folded,
   the pusher being slidingly mounted with respect to the bushing to make it possible to eject the device at least partially out of the bushing;
   a third tool comprising a cylinder and a centering piston slidable in said cylinder, the centering piston being elastically biased by a pre-stressed spring towards an idle position in which said centering piston partially extends out of the cylinder, and being dimensioned to function as, in the idle position, an inner guide for the sheath which is introduced into the cylinder up to an inner stopper of this the cylinder;
   a second tool which is shaped like a funnel and comprises two symmetrical half-shells, the second tool having an inlet stack adapted to at least partially receive the bushing,
   an outlet stack dimensioned to at least partially receive the sheath and to be partially introduced into the cylinder, and a radially tapering area which connects the inlet stack to the outlet stack.

2. The tool set according to claim 1, wherein the tool set further comprises a lever, at least one forked support member, and a chassis to which the lever and the forked support member are connected, wherein the lever is rotatably mounted around an axis spaced apart from the chassis and comprises at least a first bearing member,
   wherein the forked support member has a fork spaced apart from said chassis and which extends parallel to the rotational axis of the lever,
   wherein the fork is dimensioned to serve as a bearing to the bushing of the first tool by leaving the pusher free, and a first bearing member of said lever is arranged above the fork.

3. The tool set according to claim 2, wherein the lever comprises a second bearing member spaced apart from the first bearing member along the lever and along a direction perpendicular to the lever and to its rotational axis, the second bearing member thus being further away from the chassis than the first bearing member, wherein the third tool is connected to the chassis by its the cylinder, and wherein the second bearing member is arranged above the centering piston of the third tool.

4. The tool set according to claim 2, wherein the chassis comprises a wall of a mallet containing the at least three tools.

5. A method of implementing the tool set according to claim 1 for introducing the flow-monitoring device into the sheath before being inserted in a fluid piping, wherein the method comprises the steps of:
   introducing, by its upstream end, the device into the bushing of said first tool by applying a joining force which brings together the bushing and the downstream end of the device, whereby the pusher of the first tool is pushed out of the bushing;
   placing the sheath on the centering piston of the third tool, said piston being placed in its idle position;
   inserting the outlet stack of the second tool into the cylinder of the third tool;
   inserting, in the inlet stack of the second tool, the bushing of the first tool by bringing it on a side of the cup-type seal member that extends out of the bushing, which has the effect of radially compressing the cup-type seal member in the tapering area of the second tool; and gradually inserting the pusher of the first tool into the bushing, which has the effect of partially ejecting the device out of the bushing by radially compressing the elastic legs in the tapering area of the second tool which allows the legs to be introduced into the sheath, and the seal member to be integrally inserted into the sheath while the downstream end of the device pushes back the centering piston in the cylinder against the return force of the pre-stressed spring.

6. A method of implementing the tool set according to claim 2 for introducing the flow-monitoring device into the sheath before being inserted in a fluid piping, wherein the method comprises the steps of:

introducing, by its upstream end, the device into the bushing of said first tool by applying a joining force which brings together the bushing and the downstream end of the device, whereby the pusher of the first tool is pushed out of the bushing;

placing the sheath on the centering piston of the third tool, said piston being placed in its idle position;

inserting the outlet stack of the second tool into the cylinder of the third tool;

inserting, in the inlet stack of the second tool, the bushing of the first tool by bringing it on a side of the cup-type seal member that extends out of the bushing, which has the effect of radially compressing the cup-type seal member in the tapering area of the second tool; and gradually inserting the pusher of the first tool into the bushing, which has the effect of partially ejecting the device out of the bushing by radially compressing the elastic legs in the tapering area of the second tool which allows the legs to be introduced into the sheath, and the seal member to be integrally inserted into the sheath while the downstream end of the device pushes back the centering piston in the cylinder against the return force of the pre-stressed spring.

7. The method according to claim 6, further comprising, before the introduction of the device into the bushing of the first tool, placing said bushing on the fork while leaving the pusher extended under the fork, wherein the joining force is exerted by bringing together said lever and said chassis while the first bearing member is applied on the downstream end of the flow-monitoring device.

8. A method of implementing the tool set according to claim 3 for introducing the flow-monitoring device into the sheath before being inserted in a fluid piping, wherein the method comprises the steps of:

introducing, by its upstream end, the device into the bushing of said first tool by applying a joining force which brings together the bushing and the downstream end of the device, whereby the pusher of the first tool is pushed out of the bushing;

placing the sheath on the centering piston of the third tool, said piston being placed in its idle position;

inserting the outlet stack of the second tool into the cylinder of the third tool;

inserting, in the inlet stack of the second tool, the bushing of the first tool by bringing it on a side of the cup-type seal member that extends out of the bushing, which has the effect of radially compressing the cup-type seal member in the tapering area of the second tool; and gradually inserting the pusher of the first tool into the bushing, which has the effect of partially ejecting the device out of the bushing by radially compressing the elastic legs in the tapering area of the second tool which allows the legs to be introduced into the sheath, and the seal member to be integrally inserted into the sheath while the downstream end of the device pushes back the centering piston in the cylinder against the return force of the pre-stressed spring.

9. The method according to claim 8, wherein the step of gradually inserting the pusher of the first tool into the bushing is carried out by bringing the lever closer to the chassis while the second bearing member is applied on the pusher of the first tool.

\* \* \* \* \*